(12) United States Patent
Tatarkiewicz

(10) Patent No.: US 11,567,734 B1
(45) Date of Patent: Jan. 31, 2023

(54) METHOD AND APPARATUS FOR HIGHLY EFFECTIVE ON-CHIP QUANTUM RANDOM NUMBER GENERATOR

(71) Applicant: RANDAEMON sp. z o.o., Warsaw (PL)

(72) Inventor: Jan Jakub Tatarkiewicz, San Diego, CA (US)

(73) Assignee: RANDAEMON SP. Z O.O., Warsaw (PL)

( * ) Notice: Subject to any disclaimer, the term of this patent is extended or adjusted under 35 U.S.C. 154(b) by 0 days.

(21) Appl. No.: 17/897,138

(22) Filed: Aug. 27, 2022

Related U.S. Application Data

(60) Provisional application No. 63/400,899, filed on Aug. 25, 2022, provisional application No. 63/279,587, filed on Nov. 15, 2021, provisional application No. 63/277,759, filed on Nov. 10, 2021, provisional application No. 63/270,912, filed on Oct. 22, 2021.

(51) Int. Cl.
  *G06F 7/58* (2006.01)

(52) U.S. Cl.
  CPC .................................. *G06F 7/588* (2013.01)

(58) Field of Classification Search
  CPC .................................. G06F 7/58; G06F 7/588
  USPC .................................................. 708/250, 255
  See application file for complete search history.

(56) References Cited

U.S. PATENT DOCUMENTS

| | | |
|---|---|---|
| 3,445,591 A | 5/1969 | Koehler |
| 3,546,356 A | 12/1970 | Graybill |
| 3,790,768 A | 2/1974 | Chevalier |
| 4,527,798 A | 7/1985 | Siekierski |
| 4,855,690 A | 8/1989 | Dias |
| 4,905,176 A | 2/1990 | Schulz |

(Continued)

FOREIGN PATENT DOCUMENTS

WO 2014080272 A1 5/2014

OTHER PUBLICATIONS

Jones on "True random number generators for a more secure IoT", Mar. 2016. Retrieved on [Oct. 29, 2020]. Retrieved from the Internet <https:l/www.techdesignforums.com/practice/technique/true-random-number-generators-for-more-secure-systems/> (Year: 2016).

(Continued)

*Primary Examiner* — Emily E Larocque
(74) *Attorney, Agent, or Firm* — Manuel de la Cerra

(57) ABSTRACT

A method for correcting spatially variable electron flux in a true random number generator (TRNG) is presented. The TRNG comprises a radioactive source and an array of detectors, and the method comprises: (a) segmenting the array of detectors into a plurality of groups; (b) for each group: (1) detecting via multiple detectors an electron signal from the decay of the radioactive source; (2) determining a number of detections based on the detection of step (b)(1); (3) determining a group median count based on the number of detections; (4) comparing the group median count to either (A) a detection count from a single detector within the group, or (B) a detection count from multiple detectors within the group; (5) based on the comparison, assigning a value to a string of values; and (c) determining a true random number based on the string of values. A TRNG implementing the method is also disclosed.

26 Claims, 8 Drawing Sheets

Method 100

(56) References Cited

U.S. PATENT DOCUMENTS

| | | | |
|---|---|---|---|
| 5,570,307 | A | 10/1996 | Takahshi |
| 5,627,894 | A | 5/1997 | Albert |
| 5,732,138 | A | 3/1998 | Noll |
| 5,987,483 | A | 11/1999 | Edelkind |
| 6,249,009 | B1 | 6/2001 | Kim |
| 3,001,054 | A1 | 8/2001 | Peart |
| 6,346,700 | B1 | 2/2002 | Cunningham |
| 6,415,309 | B1 | 7/2002 | Shilton |
| 6,430,170 | B1 | 8/2002 | Saints |
| 6,539,410 | B1 | 3/2003 | Klass |
| 6,542,014 | B1 | 4/2003 | Saito |
| 6,687,721 | B1 | 2/2004 | Wells |
| 6,697,829 | B1 | 2/2004 | Shilton |
| 6,745,217 | B2 | 6/2004 | Figotin |
| 7,031,991 | B2 | 4/2006 | Hars |
| 7,124,157 | B2 | 10/2006 | Ikake |
| 7,476,370 | B2 | 1/2009 | Mitsugashira |
| 8,001,168 | B2 | 8/2011 | Tsuyuzaki |
| 3,037,117 | A1 | 10/2011 | Saito |
| 9,335,972 | B2 | 5/2016 | Yang |
| 10,430,161 | B1 | 10/2019 | Tatarkiewicz |
| 2004/0035201 | A1 | 2/2004 | Vincze |
| 2009/0165086 | A1 | 6/2009 | Trichina |
| 2012/0030268 | A1 | 2/2012 | Liu |
| 2015/0064047 | A1 | 3/2015 | Elwha |
| 2018/0217817 | A1 | 8/2018 | Gorfinkle |
| 2019/0235839 | A1* | 8/2019 | Clark .............. G06F 7/588 |
| 2019/0258458 | A1 | 8/2019 | Walmsley |
| 2019/0310830 | A1 | 10/2019 | Tatarkiewicz |
| 2019/0347076 | A1 | 11/2019 | Park |
| 2020/0065068 | A1 | 2/2020 | Hekmatshoartabari |
| 2020/0092328 | A1 | 3/2020 | Kim |
| 2020/0210147 | A1 | 7/2020 | Lee |
| 2020/0326912 | A1* | 10/2020 | Park .............. G06F 7/588 |

OTHER PUBLICATIONS

S. Burri, D. Stucki, Y. Maruyama, C. Bruschini, E. Charbon and F. Regazzoni, "SPADs for quantum random number generators and U beyond," 2014 19th Asia and South Pacific Design Automation Conference (AS P-DAC), Singapore, 2014, pp. 788-794, doi: 10.1109/ASPDAC.2014.6742986. (Year: 2014).

Duggirala R., Lal A., Radhakrishnan S. (2010) Radioisotope Decay Rate Based Counting Clock. In: Radioisotope Thin-Film Powered Microsystems. MEMS Reference Shelf, vol. 6. Springer, New York, NY. https://doi.org/10.1007/978-1-4419-6763-3_7 ( Year: 2010).

Collantes et al. "Quantum Random Number Generators", 2016 Retrieved from the Internet <https://arxiv.org/pdf/1604.03304.pdf> (Year: 2016).

Rohe, "RANDy—A True-Random Generator Based on Radioactive Decay", 2003. Retrieved from the Internet <https://citeseerx.ist.psu.edu/viewdoc/download?doi=1 0.1.1.11 0.9725&rep=rep1 &type=pdf> (Year: 2003).

B. Škorić 2015 Lecture notes 2IMS10 Technical University Eindhoven (Holland) Physical aspects of digital security.

D.F. Williams et al. 1993 Oak Ridge National Laboratory TM-12399 Recovery and Purification of Nickel-63 from HFIR-irradiated Targets.

NRC Personal Annual Radiation Dose Calculator https://www.nre.gov/aboutnrc/radiation/around-us/calculator.html.

Patuleanu et al. 2017 Proc. Romanian Acad. series A, vol. 18, 389-402 True random number sequences from gamma-decay using four extraction methods.

International Search Report and Written Opinion for PCT/US2019/017748 dated Dec. 30, 2019 (6 pages).

International Search Report in PCT/US2020/065962 dated Apr. 22, 2020 (6 pages).

* cited by examiner

LEGEND FOR FIG. 2B

Silicon Substrate 8
Detector 10
Chip Cover/Enclosure 50
Radioactive Source 55
Cavity 60
TSV /Connections 65
Processing Circuitry 70

Method 100

Method 200

METHOD AND APPARATUS FOR HIGHLY EFFECTIVE ON-CHIP QUANTUM RANDOM NUMBER GENERATOR

PRIORITY APPLICATIONS AND REFERENCES

This application claims priority to U.S. Provisional Application Ser. 63/400,899 titled "Method and Apparatus for Highly Effective On-Chip Quantum Random Number Generator" and filed on Aug. 25, 2022; to U.S. Provisional Application Ser. 63/344,496 titled "Method and Apparatus for Highly Effective On-Chip Quantum Random Number Generator" and filed on May 20, 2022; to U.S. Provisional Application Ser. 63/279,587 titled "Method for Cost-Effective Nickel-63 Radiation Source for True Random Number Generators" and filed on Nov. 15, 2021; to U.S. Provisional Application Ser. 63/277,759 titled "Method for Cost-Effective Nickel-63 Radiation Source for True Random Number Generators" and filed on Nov. 10, 2021; and to U.S. Provisional Application Ser. 63/270,912 titled "Method And Apparatus For True Random Number Generator Based On Nuclear Radiation" and filed on Oct. 22, 2021, all of which are incorporated herein by reference in their entireties.

This application is further related to U.S. application Ser. No. 17/861,014 titled "Method And Apparatus For Highly Effective On-Chip Quantum Random Number Generator" and filed on Jul. 8, 2022; to U.S. Provisional Application Ser. 63/224,811 titled "Method And Apparatus For Highly Effective Beta Decay Based On-Chip True Random Number Generator" and filed on Jul. 22, 2021; to U.S. Provisional Application Ser. 63/234,820 titled "Method And Apparatus For Highly Effective Beta Decay Based On-Chip True Random Number Generator" and filed on Aug. 19, 2021; to U.S. Provisional Application Ser. 63/235,031 titled "Method And Apparatus For Highly Effective Beta Decay Based On-Chip True Random Number Generator" and filed on Aug. 19, 2021; to U.S. application Ser. No. 17/687,630 titled "Method for Making Cost-Effective Nickel-63 Radiation Source for True Random Number Generators" and filed on Mar. 5, 2022; to U.S. application Ser. No. 17/513,661 titled "Method And Apparatus For Highly Effective Beta Decay Based On-Chip True Random Number Generator" and filed on Oct. 28, 2021; to U.S. application Ser. No. 17/409,971 titled "Method And Apparatus For Highly Effective On-Chip True Random Number Generator Utilizing Beta Decay" and filed on Aug. 24, 2021; to U.S. Provisional Application Ser. 62/984,528 titled "Method And Apparatus For Tritium-Based True Random Number Generator" and filed on Mar. 3, 2020; to U.S. Provisional Application Ser. 63/062,672 titled "Method And Apparatus For Beta Decay Based True Random Generator" and filed on Aug. 7, 2020; to U.S. Provisional Application Ser. 62/655,172 titled "Apparatus, Systems, And Methods Comprising Tritium Random Number Generator" and filed on Apr. 9, 2018; to U.S. Provisional Application Ser. 62/803,476 titled "Apparatus, Systems, And Methods Comprising Tritium Random Number Generator" and filed on Feb. 9, 2019, now U.S. Pat. No. 10,430,161; to U.S. application Ser. No. 16/273,365 titled "Apparatus, Systems, And Methods Comprising Tritium Random Number Generator" and filed on Feb. 12, 2019; to U.S. application Ser. No. 16/990,087 titled "Apparatus, Systems, And Methods For Beta Decay Based True Random Number Generator" and filed on Aug. 11, 2020, now U.S. Pat. No. 10,901,695; to U.S. application Ser. No. 17/126,265 titled "Method and Apparatus for Tritium-based True Random Number Generator" and filed on Dec. 18, 2020, now U.S. Pat. No. 11,048,478; to U.S. application Ser. No. 17/062,307 titled "Apparatus, Systems, And Methods For Beta Decay Based True Random Number Generator" and filed on Oct. 2, 2020, now U.S. Pat. No. 11,036,473; PCT Application SN PCT/US19/17748 titled "Apparatus, Systems, And Methods Comprising Tritium Random Number Generator" and filed on Feb. 13, 2019; to PCT Application SN PCT/US20/65962 titled "Apparatus, Systems, And Methods For Beta Decay Based True Random Number Generator" and filed on Dec. 18, 2020; and to PCT Application SNPCT/US20/65976 titled "Apparatus, Systems, And Methods For Beta Decay Based True Random Number Generator" and filed on Dec. 18, 2020. Each of the patent applications, issued patents, and other references listed above, discussed and/or cited herein, are incorporated by reference as if fully set forth herein.

TECHNICAL FIELD

The present disclosure relates generally to true random number generators, specifically to random number generator technologies utilizing the spontaneous Nickel-63 isotope decay, as well as apparatus, systems, and methods regarding the same.

BACKGROUND

As opposed to pseudo-random number generators based on numerical algorithms, there are true random number generator (TRNG) devices that depend on natural random processes: multiple bipolar switches, thermal noise, light scattering by dichroic mirrors, chaotic systems, and decay of radioactive nuclei. Some of these TRNGs are listed in the provisional applications to which the present application claims priority, and those references are incorporated herein by reference as if fully set forth herein.

The decay of radioactive nuclei is considered to be the most independent from environmental influences like temperature, pressure, or acceleration. However, typical nuclear-based TRNGs require a large size or number of detectors to enable the registration of particles emitted as a result of radioactive decay. Also, many nuclei used in such devices are highly radioactive and poisonous, hence dangerous to humans if a device is broken.

In previous disclosures by the present inventor, a TRNG is disclosed. For example, in U.S. Pat. No. 10,901,695 entitled "Apparatus, systems, and methods for beta decay based true random number generator", an array of detectors was employed, and a method of adjusting counts by changing the read-out time was described. The contents of that patent are incorporated herein by reference. The source of entropy in the '695 patent was a thin layer of Nickel-63 attached to the inner surface of the metallic cover of the package of the integrated circuit (IC). Likewise, in U.S. Pat. No. 11,281,432 entitled "Method and apparatus for true random number generator based on nuclear radiation", an array of detectors was employed to detect electrons (i.e., entropy) from the radiation source. Further, the '432 patent disclosed a method of adjusting the counting rates of these detectors based on the varying diameter of their surface. The disclosed method is very effective in compensating for the limited (finite area) radiation source. However, designing and manufacturing such a detector array is complicated because the typical electrical parameters of a single diode vary considerably with the area. The contents of both the '695 and '432 patents are incorporated herein by reference.

Another solution is described in co-pending U.S. patent application Ser. No. 17/861,014 titled "Method and Apparatus for Highly Effective On-chip Quantum Random Number Generator" filed on Jul. 8, 2022, which discloses a true random number generator that includes a CMOS matrix detector with a top surface. A shell is positioned over the top surface, and the shell includes a radiation source and a luminophore or scintillator constructed to emit photons towards the top surface when the luminophore or scintillator is struck by electrons from the radioactive decay of the source of the radiation. The CMOS or SPAD detector matrix is constructed to detect the photons emitted from the luminophore or scintillator and to produce a signal for the detected photons. The signal is communicated to a processor that produces true random numbers based on the signal from the detected photons.

The previous solutions, however, may require unique radiation source structures, or variable detector sizes, which increase manufacturing complexity, costs, and failure rates. Therefore, a cost-effective method for making a TRNG without these limitations would be advantageous. Such a TRNG can then be used in compact personal devices or high throughput apparatus designed for network devices like servers.

SUMMARY

A method for correcting spatially variable electron flux in a true random number generator (TRNG) is disclosed. The TRNG comprises a radioactive source and an array of detectors, and the method comprises: (a) segmenting the array of detectors into a plurality of groups; (b) for each group: (1) detecting via multiple detectors an electron signal from the decay of the radioactive source; (2) determining a number of detections based on the detection of step (b)(1); (3) determining a group median count based on the number of detections; (4) comparing the group median count to either (A) a detection count from a single detector within the group, or (B) a detection count from multiple detectors within the group; (5) based on the comparison, assigning a binary value to a string of values; and (c) determining a true random number based on the string of values. The segmenting of step (a) may be based on the symmetry of the array to form groups that are exposed to the same average electron flux.

The array of detectors may have a frame rate, and step (b)(1) may be carried out for an exposure period that is longer than a single frame period. Step (b)(4) may be carried out for a read period that is shorter than the exposure period. The exposure period may be a least 10 times longer than the exposure period.

For each group in the plurality, steps (b)(4) and (b)(5) may be performed for a recalibration period. Upon expiration of the recalibration period, the method may return to step (b)(1) and reset the calibration period.

The array of detectors may be an N×N array, where N is an even number—for example an array of 512×512 detectors. The array may be segmented into more than 10 groups, or into more than 100 groups. The segmenting of step (a) is based on the symmetry of the array to form groups that are exposed to the same average electron flux.

A TRNG with a radioactive source, an electronic sensor comprised of an array of detectors exposed to the radioactive source and a processor connected to the array of detectors is disclosed. The processor may implement the above method. The TRNG may further include an amplifier constructed to amplify a signal generated by the sensor and a filter constructed to filter the signal. The processor is connected to the array of detectors through the amplifier and filter. The sensor, processors, amplifier and filter may be formed on an integrated circuit.

Additional aspects, alternatives, and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF EXAMPLE EMBODIMENTS

Figure 1:
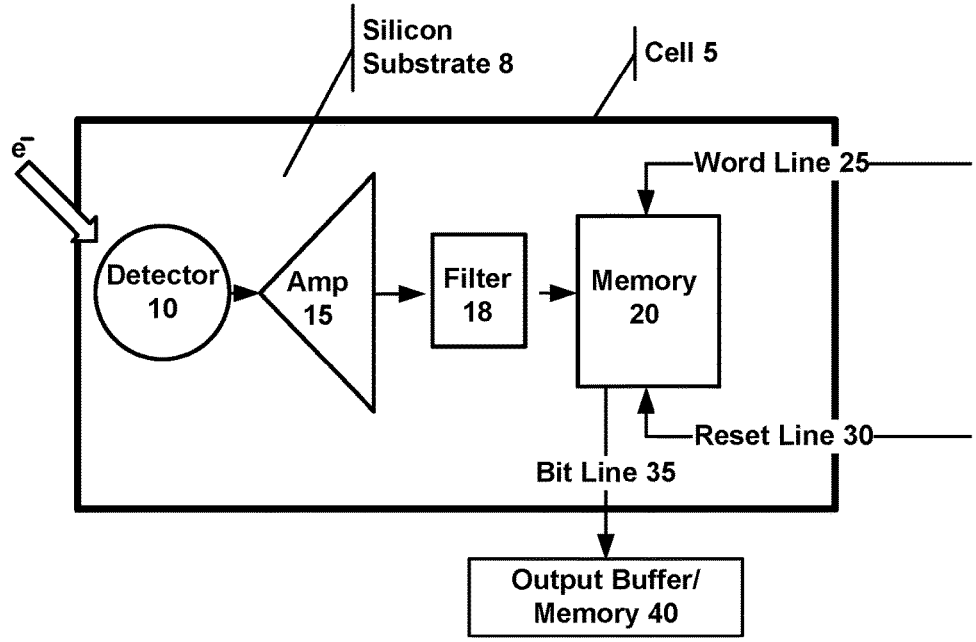
FIG. 1 illustrates a circuit for registering electron hits of the detector.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in a singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship, or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds to the attached figures and is provided for ease of reference, where like reference numerals designate corresponding features throughout the specification and figures:

Cell 5
Silicon Substrate 8
Detector 10
Detector Group A 10-A
Detector Group B 10-B
Detector Group C 10-C
Detector Group D 10-D
Detector Group E 10-E
Detector Group F 10-F
Detector Group G 10-G
Detector Group H 10-H
Detector Group I 10-I
Detector Group J 10-J
Amplifier 15
Filter 18
Memory 20
Word Line 25
Reset Line 30
Bit Line 35
Output Buffer/Memory 40
Sensor Array Matrix 45
Chip Cover/Enclosure 50
Radioactive Source 55
Cavity 60
Through Silicon Vias/Connections 65
Processing Circuitry 70
Control Block 75
TRNG Processor 80
First Method for Correcting Variable Flux 100
Steps in First Method for Correcting Variable Flux 105-155
Second Method for Correcting Variable Flux 200
Steps in Second Method for Correcting Variable Flux 205-250

This is related to our previous published U.S. patents and applications listed above, in which we described the general idea of using pure beta minus (electron emission) nuclear decay as a medium or source of entropy for generating true random numbers by detecting emitted electrons on-chip through an electronic sensor or array of sensors. In this application, we would like to present the approach that allows for a much faster or more efficient (larger number of bits per time unit) generation of random numbers on-chip from the very same source of entropy i.e., $^{63}$Ni.

Searching the BIPM *Table of Radionuclides* (2008), we find three abundant nuclides that produce pure beta-minus decay (only emission of an electron, and to conserve momentum, some practically undetectable neutrino) in the range of energies below 512 keV (which is the energy of electrons that produces highly penetrable gamma rays creating potential radiation hazard) and having reasonable half-life times of more than ten years. There are some other exotic nuclides listed in the abovementioned tables and fulfilling our requirements, but they are mostly by-products of decays of other exotic nuclides, hence not practical for industrial applications. Those three suitable nuclides, easy to obtain and to process, are:

a. $^3$H tritium with a maximum energy of emitted electrons being 18 keV (mean energy about 5.7 keV) and a half-life of about 12.4 years;
b. $^{63}$Ni nickel with a maximum energy of emitted electrons being about 67 keV (mean energy about 17 keV) and a half-life of about 98.7 years; and
C. $^{14}$C carbon with a maximum energy of emitted electrons being about 156 keV (mean energy about 45 keV) and a half-life of about 5,700 years.

When dealing with these low-energy radiative nuclei (except in the case of gaseous tritium that is very difficult to handle due to its high permeation through solids and thus is better processed in the form of gel or solid compound, as discussed in our U.S. Pat. No. 11,048,478), one has to note that because of the limited range of emitted electrons in solids (self-absorption of electrons), only a very thin layer of radioactive material is externally active i.e., electrons emitted from the material are created only in a very thin layer. For example, $^{63}$Ni has a maximum surface radioactivity of about 20 mCi/cm$^2$ independent from the increasing thickness of the material, cf. Belghachi et al. (2020)—only about 15 microns of such a material is relevant for external radioactivity. We note that because 1 Ci equals about $3.7.10^{10}$ decays/sec, the limit of 20 mCi/cm$^2$ corresponds to about $7.4.10^8$ decays/(cm$^2$ sec) or slightly less than $10^9$ decays/(cm$^2$ sec). This suggests that a potential on-chip random number generator based on $^{63}$Ni can produce up to 1 billion bits per second from 1 cm$^2$ of the detector area (with radiation source having roughly same area), with more area of the chip taken by other electronics. The low energy of tritium beta decay makes the thickness of the active layer much thinner than for other pure beta decay radionuclides considered here and thus gives a smaller maximum number of bits generated per area. On the other hand, the half-life of a given nuclide limits the total number of electrons emitted per time unit. For example, with 10 billion or $10^{10}$ atoms of $^{63}$Ni, only half will decay during 98.7 years or about 2 per second. For $^{14}$C radionuclide with a very long half-life, this severely limits the total possible radioactivity per time unit: one needs about a trillion or $10^{12}$ atoms of $^{14}$C to get 2 decays per second, or 100× more carbon 14 nuclei are needed for the same radioactivity as for Nickel-63. In other words, about 12× larger area of radioactive material will be required to get the same effective number of decays per second because the range of 45 keV electrons (average energy) in carbon is only about 8× larger than of 17 keV electrons (average energy) in Nickel-63, cf. Berger and Seltzer (1982) (the effective layer can be 8× thicker). Hence $^{63}$Ni seems to be the sweet spot of efficiency per unit surface area of radioactive material as a source of entropy for on-chip random number generators. However, its maximum radioactivity still limits the number of bits that can be generated on the chip because one cannot use too-big detectors due to the so-called detector reaction dead time. The shortest time between pulses that can be detected depends on the low capacitance of the detector—this capacitance increases proportionally to the area of a detector. In our U.S. Pat. No. 11,036,473, we suggested using an array of small detectors that can be applied to overcome the abovementioned limitation. Here we describe problems associated with such an approach and methods to solve these problems.

The main problem of all random number generators based on natural phenomena like the emission of photons or electrons (known as pure quantum processes) is the stability of the entropy source. In the case of photon-based devices, the source of photons is highly dependent on temperature, supplied voltage, and long-term stability of the light emitter (diode or laser) among other factors. For beta decays, resulting from weak interactions inside the nuclei, there are no practical influence of external fields (like gravitational or electromagnetic) on the timing or direction of decays. Only at very low temperatures close to absolute zero and in very high magnetic fields do these decays show anisotropy or the so-called parity violation, cf. Nobel Prize 1957. The only effect on the stability of the radionuclide entropy source at normal conditions is its own half-life that diminishes the number of decays over time. As mentioned above, for $^{63}$Ni the half-life is about 98.7 years. According to an exponential equation that governs the number of decays in time $N=N_0-e^{-\lambda t}$ (N is the number of atoms left from the initial number $N_0$ after time t with $k=\ln(2)/t_{1/2}$, where $t_{1/2}$ is the half-life), e.g., after 2 years there will be still 98.6% of Nickel-63 radioactive atoms left or in other words, initially, Nickel-63 activity will only diminish by less than 0.7% per year. That can be easily corrected by the process of self-calibration mentioned in our U.S. Pat. No. 11,036,473 (changing the read-out time).

Let us make simple estimates for the number of small detectors required to generate 1 billion or $10^9$ bits per second with a $^{63}$Ni entropy source. Assuming an individual detector radius of 11 microns and entropy source with an activity of 15 mCi/cm$^2$, we get about 527 counts per second per detector area. 1,024 detectors that are read 1,000 times per second will give us, as per our U.S. Pat. No. 11,036,473, the number of 1 million bits per second. However, diode detectors (such as PIN, SPAD, or APD diode), unlike pixels of CCD cameras, cannot collect charge and hence require additional simple memory circuits and readout lines to retain counts.

A simple cell 5 required to register any electron hits of the detector is presented in FIG. 1. The cell 5 is comprised of silicon substrate 8 with a detector 10, connected to an amplifier 15, and a memory 20 to store a detection event. The amplifier 15 amplifies the pulse produced by the detector 10 when an electron hits the detector 10 and has a write buffer at the output. This buffer writes "1" to the memory 20 when an electron is detected. Subsequent detection events at the very same detector will not change the state of the memory cell. Thus, the memory cell may contain only zero or one—the equivalent of one random bit. The cell 5 may have a word line 25 that, when signaled, causes the memory 20 to report its contents on the bit line 35. The reset line 30 clears the cell of its memory to ready the cell for another detection period. The individual cells can be arranged into an array, as described in the patent applications cited above. The state of all the cells 5 in the array is read and stored in the output buffer/memory 40 via the bit lines 35 when this linear array 40 is selected with "1" on the word line 25. New content in the output buffer/memory 40 replace the previous one.

Figure 2A:
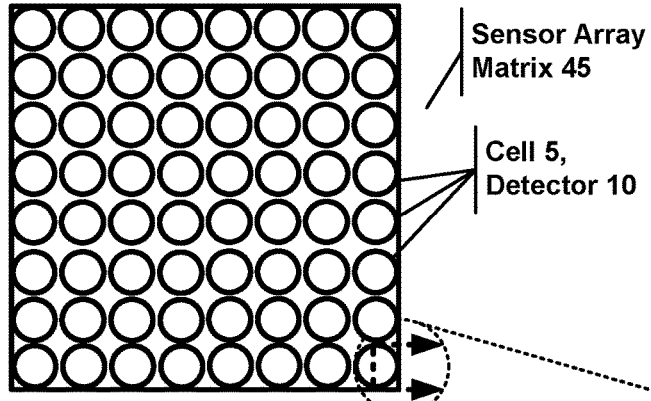
FIG. 2A is a top view of a detector chip with a cell array matrix with the cover and radioactive source made semi-transparent so that the array of detectors can be seen.
Figure 2B:
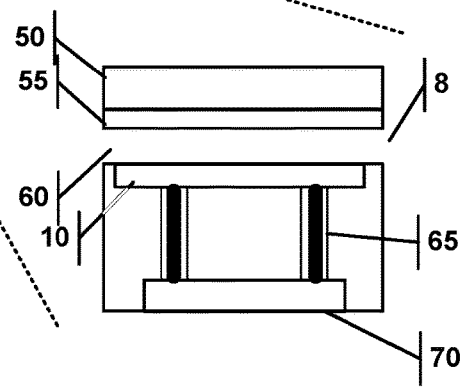
FIG. 2B is a cross-sectional view of a portion of a single detector chip within a cell array matrix with a cell array of FIG. 2A illustrating a circuit for registering electron hits of the detector using through silicon vias.

FIGS. 2A and 2B illustrate a TRNG detector chip comprising a sensor array matrix 45 with a chip cover/enclosure 50 and a radioactive source 55 (both made semi-transparent so that the array of detectors 5 can be seen). FIG. 2B is a cross-sectional view of a portion of a detector cell with a single detector cell. This cross-sectional view illustrates the chip cover/enclosure 50 and the radioactive source 55 (the preferred source is radioactive Nickel-63), separated by a cavity 60 from the detector 10. The processing circuitry 70 connects to detector 10 through silicon vias connections (TSV) 65 in the silicon substrate 8, thus protecting the processing circuit 70 from the beta radiation i.e., the electrons emitted by the radioactive source. The thickness of the TSV may be selected to optimize the protection of the processing circuitry 70. TSV are described e.g., in Knechtel J. et al. 2017. The Si wafer will have a total thickness of much more than 10 microns, so all electrons emitted by the radioactive source will be absorbed in it.

Figure 3:
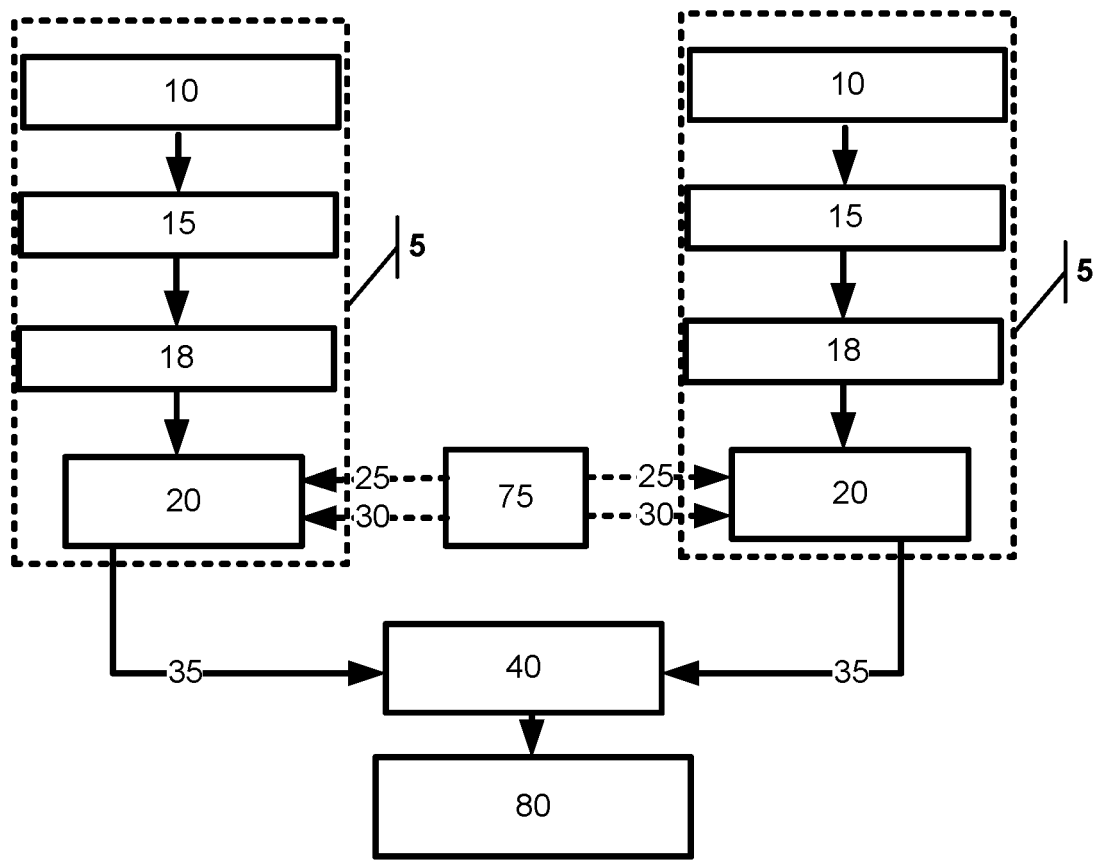
FIG. 3 is a flow diagram of the various components that may be placed on the integrated circuit.

FIG. 3 is a flow diagram of the various components that may be placed on the integrated circuit using cell 5. The cells include a silicon substrate 8 with a detector 10 constructed to detect electrons within the cavity from the decay of the radioactive Nickel-63 and to produce a signal for the detected electrons. The amplifier 15 connected to the detector 10 amplifies the signal and passes it to a filter 18, then to a memory 20 for storage. A control block 75 is connected to each cell 5 in the linear array. The contents of the memory 20 can be passed to the output buffer 40, from which a true random number may be generated by the TRNG processor 80.

A true random number is optimally generated using the entropy of nuclear decays when the radiation source generates the same average flux of electrons on each detector, with fluctuations of the flux being the source of the entropy. In other words, all the detectors in the array should be exposed to the same average flux of electrons. If some areas are constantly hotter than others, those areas will report a detection more frequently, which will result in the generation of numbers that are not random. To arrive at a uniform flux, the source of radioactive material should be infinite; otherwise, detectors in the middle of an array will receive much larger doses of electrons than those on the edge of an array. Infinite sources are not possible, so having a large radiation area of a source as compared to the detector array area can partially mitigate the issue of non-uniform flux, but will not eliminate it.

Figure 4A:
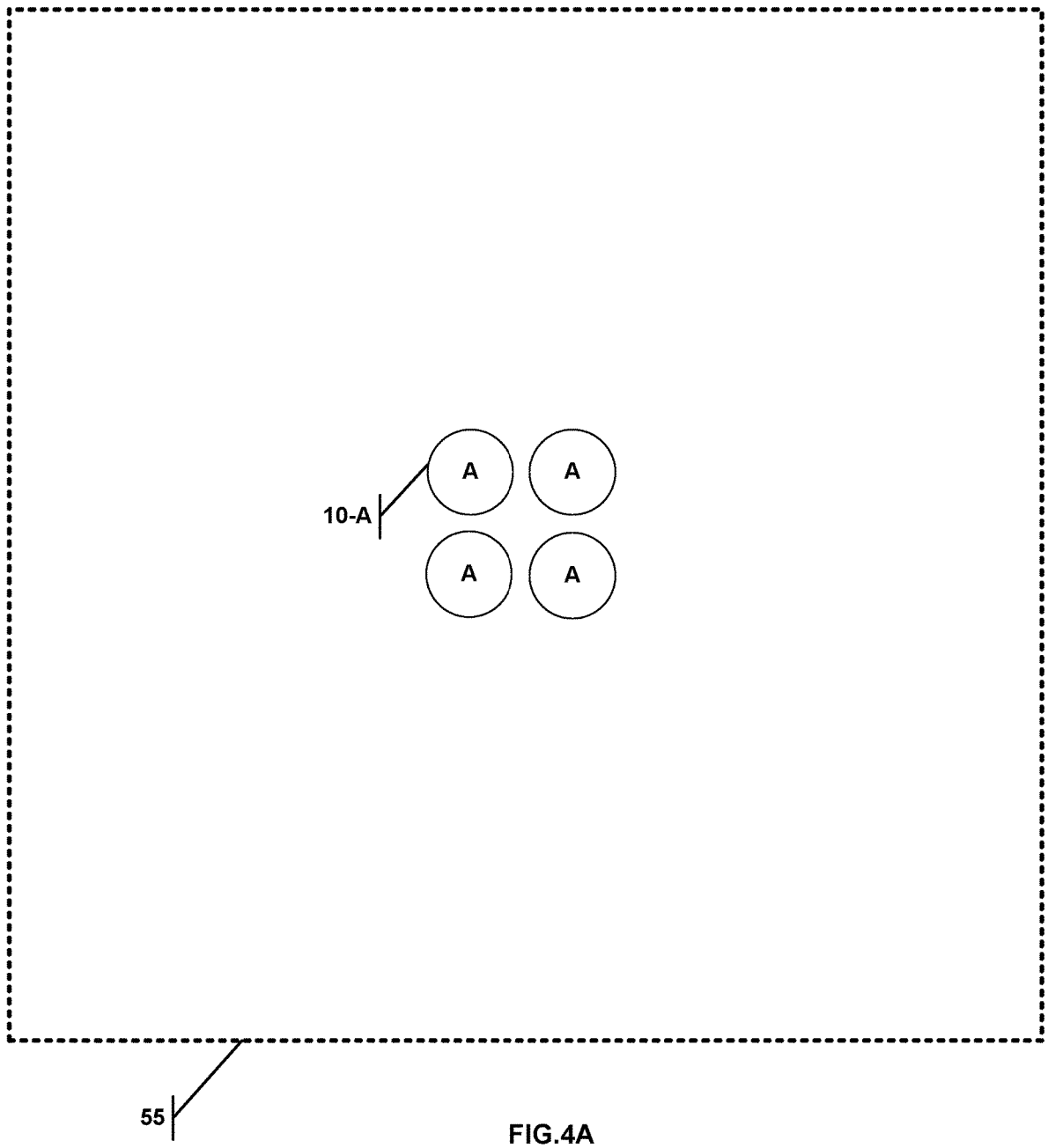
FIG. 4A illustrates a 2×2 array of detectors (Group A) that experiences average uniform electron flux from the radiation source.

Shown in FIG. 4A is a 2×2 array of detectors that is placed symmetrically in the middle of a square radiation source 55. This array forms a group of detectors 10A (labeled A), each of which experiences the same average electron flux from the radiation source 55.

Figure 4B:
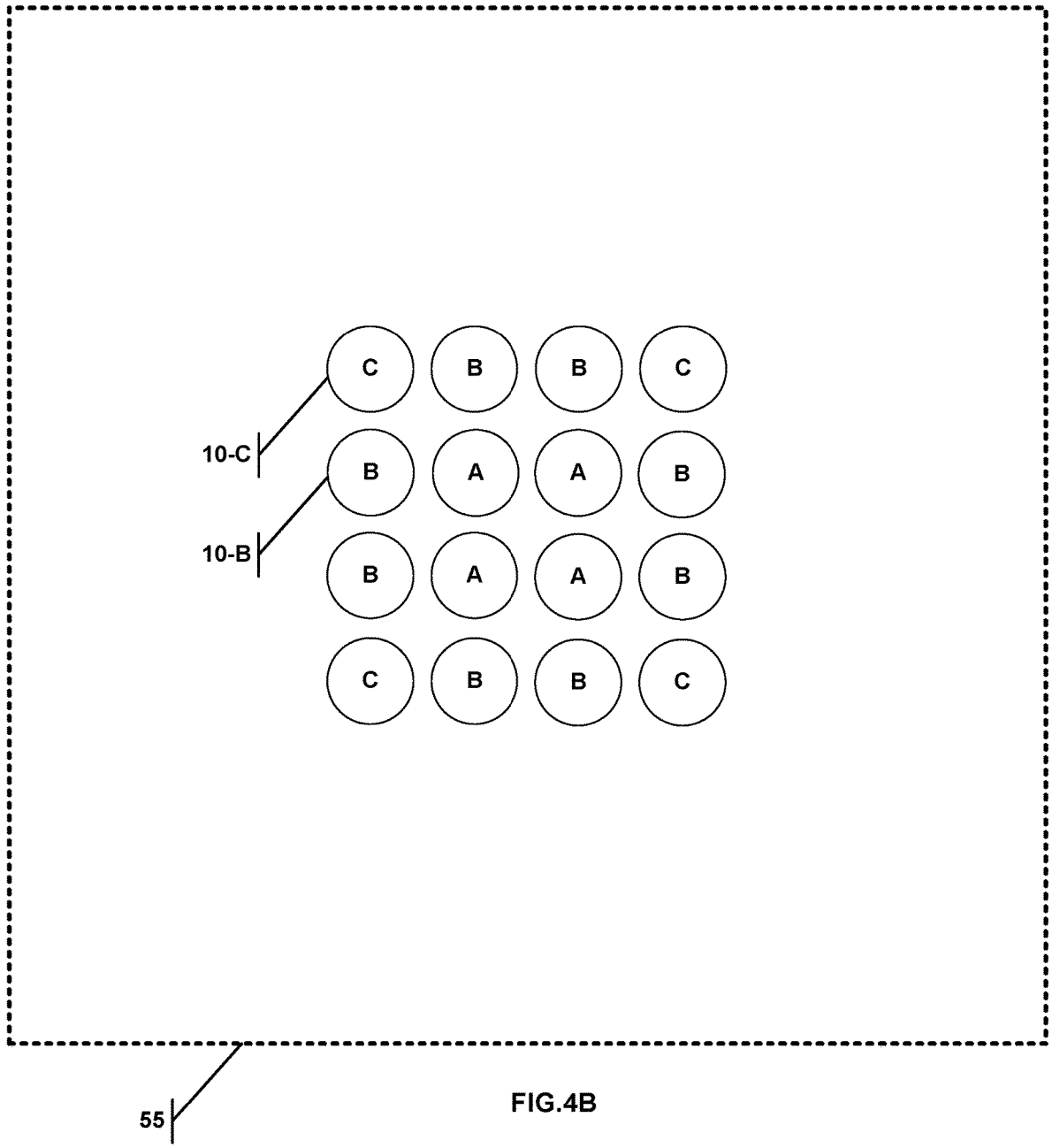
FIG. 4B illustrates a 4×4 array of detectors, comprised of three groups (A, B, and C), each of which experiences different average uniform electron fluxes from the radiation source.

Expanding the array of detectors to a 4×4 array as shown in FIG. 4B—with Group A in the middle—yields another two groups, Group B (10-B) with eight detectors and Group C (10-C) with four detectors. Each detector within a given group experiences the same average electron flux as the other detectors within that given group. In this 4×4 array, Group A would be predicted to have the highest flux, followed by Group B and then Group C.

Figure 4C:
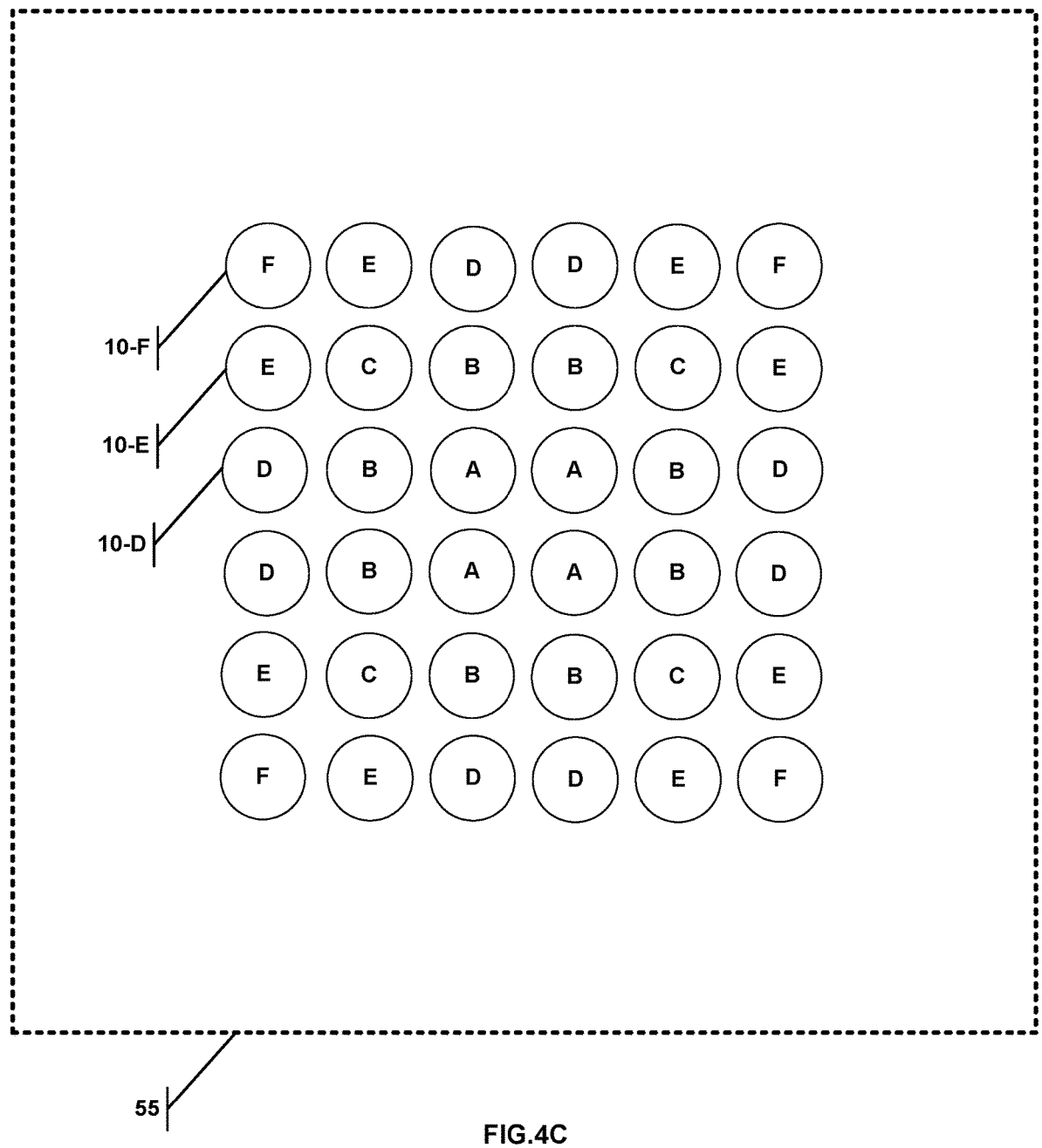
FIG. 4C illustrates a 6×6 array of detectors, comprised of six groups (A, B, C, D, E, and F), each of which experiences different average uniform electron fluxes from the radiation source.

Expanding the array of detectors to a 6×6 array as shown in FIG. 4C—with Group A in the middle, and Group B and Group C surrounding Group A—yields another three groups: Group D (10-D), Group E (10-E), and Group F (10-F). Each detector within a given group experiences the same average electron flux as the other detectors within that given group. In this 6×6 array, Group A would be predicted to have the highest flux, followed in descending flux order: Group B, Group C, Group D, Group E, and Group F.

Figure 4D:
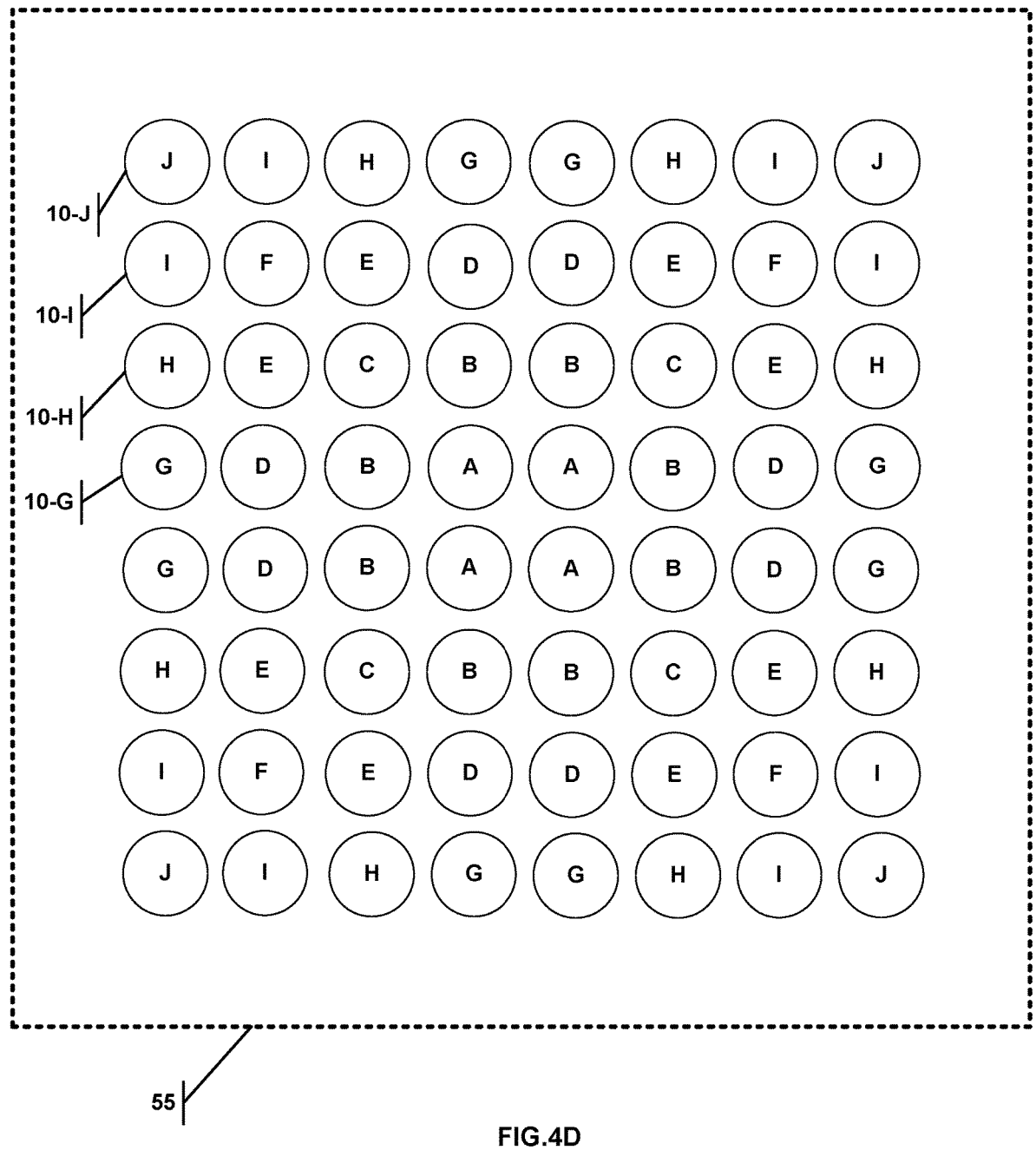
FIG. 4D illustrates an 8×8 array of detectors, comprised of ten groups (A, B, C, D, E, F, G, H, I, and J), each of which experiences different average uniform electron fluxes from the radiation source.

Again, expanding the array of detectors to an 8×8 array, as shown in FIG. 4D, yields 10 groups, with Group A in the middle, Groups B/C surrounding Group A, and Groups D/E/F surrounding Groups B/C, yields an additional four groups D (10-D), Group E (10-E), and Group F (10-F). Again, each detector within a given group experiences the same average electron flux as the other detectors within that given group. In this 8×8 array, Group A would be predicted to have the highest flux, followed in descending flux order: Group B, Group C, Group D, Group E, Group F, Group G, Group H, Group I, and Group J. Each group has at least four detectors.

FIGS. 4A through 4D demonstrate that the edges of the array contain a pair of detectors that are in the same group. This pattern repeats in each concentric ring of detectors. For an array of 512×512 detectors, following the pattern just described would result in 256 groups in the outer-most ring of detectors, and a total of 32,896 groups for the entire array, where each detector within a given group experiences the same average electron flux as the other detectors within that given group.

More generally, the array may be an N×M array. The region of interest (ROI) of the array is preferably square, and the radiation source is also square and centered over the ROI. This is illustrated in FIGS. 4A-4D, where the ROI for each of the illustrated arrays is the entire array. However, the ROI may be less than the entire array and still implement the methods discussed herein.

Figure 5:
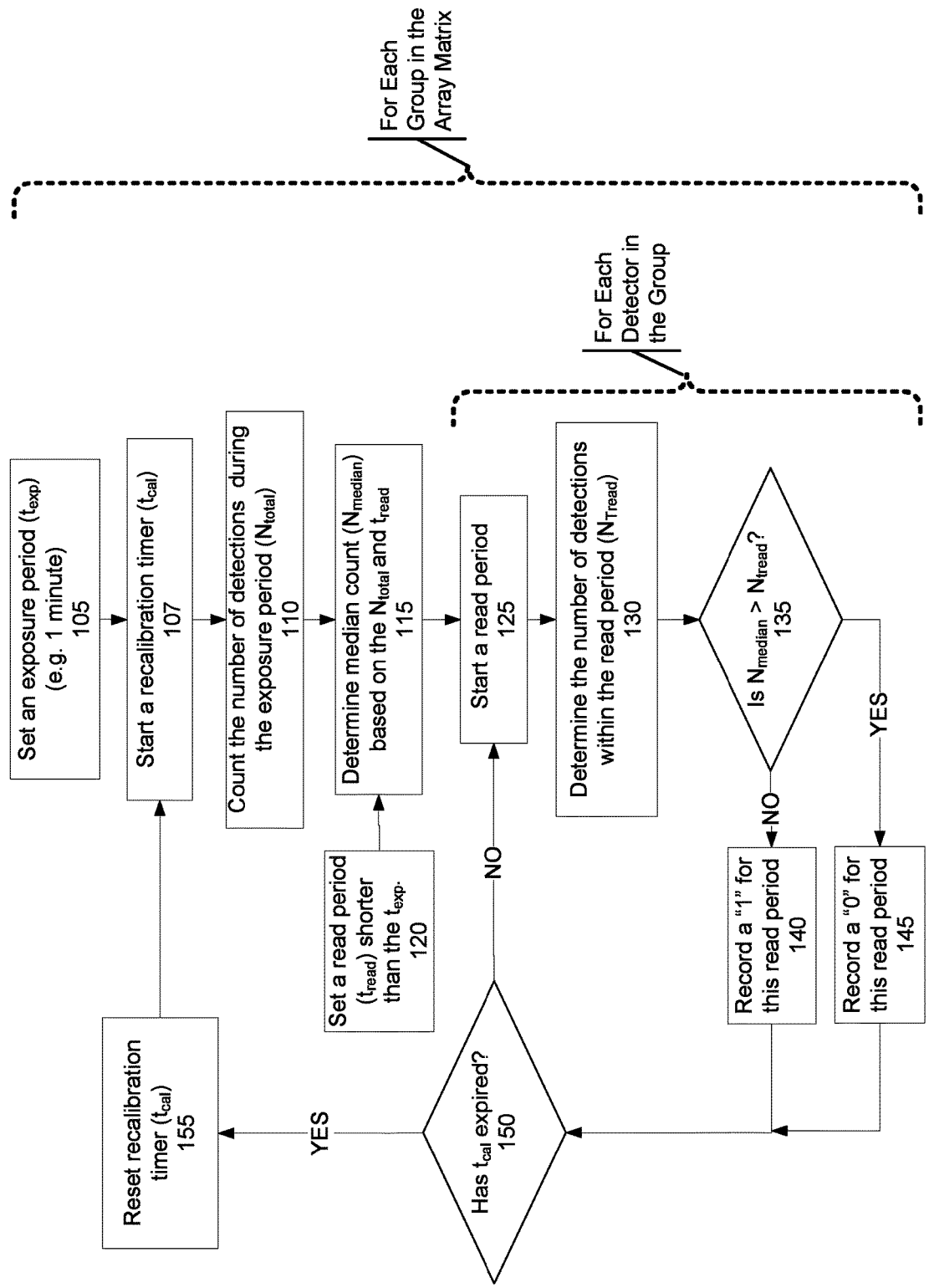
FIG. 5 is a flow chart detailing the first method for correcting variable flux.

If one measures a median count of detections per given group during some long period—e.g., 1 minute (assuming 100 fps, this gives a reading of 6,000 frames)—then in a shorter period, one can compare counts in each detector with that median: if it is smaller, then we assign zero for that detector; if larger, then it is assigned one. This method 100 is shown in FIG. 5. An exposure period ($t_{exp}$) is set in step 105, and the total number of detections within the $t_{exp}$ ($N_{total}$) is determined for all detectors in a given group in step 110. After setting a read period ($t_{read}$), a median counted number ($N_{median}$) can be determined by using a standard cumulative formula. The calculation of $N_{median}$ (Steps 110-115) should be refreshed occasionally so that any trends in the flux variations are accounted for. This is accomplished by starting a recalibration timer ($t_{cal}$) in step 107 and periodically checking whether the timer has expired in step 150, and if expired, the calibration time ($t_{cal}$) is reset and restarted at steps 155 and 107.

The method may then begin to compare $N_{median}$ to the actual number of detections for each detector in the given group ($N_{tread}$), as shown in steps 125 through 135. The exposure period ($t_{exp}$) is preferably longer than the read period ($t_{read}$). It may be at least 10 times longer. Turning again to FIG. 5, if the $N_{median}$ is greater than $N_{tread}$, then the system may record in a string of values a "1" for this reading period (step 140) for a given detector; otherwise, it records a "0" (step 145), or vice versa. The method repeats steps 125-145 for each detector in a given group and runs the method 100 for each group in the array matrix. From the string of values, a true random number may be derived.

Figure 6:
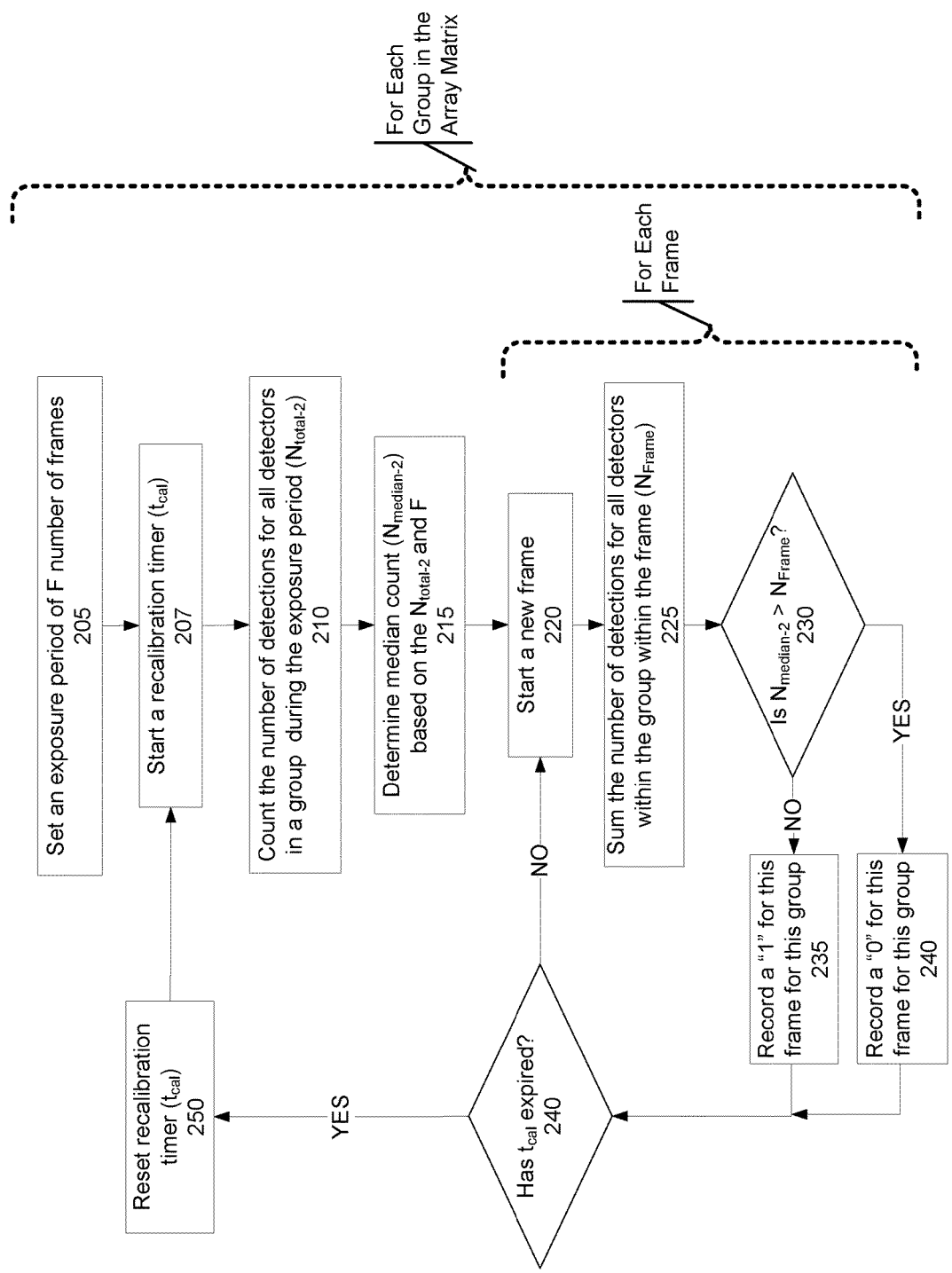
FIG. 6 is a flow chart detailing a second method for correcting variable flux.

FIG. 6 illustrates another method 200 for correcting variable flux. An exposure period of F number of frames is selected (step 205), and then the total number of detections for all the detectors in a given group during the exposure period are counted ($N_{total-2}$) at step 210. The number of frames F should be large enough to provide a robust average. To arrive at a frame average ($N_{median-2}$) for the group, $N_{total-2}$ is divided by the number of frames F in the exposure period (step 215). The calculation of $N_{median-2}$ should be refreshed occasionally so that any trends in the flux variations are accounted for. Like in method 100 above, this is accomplished by starting a recalibration timer ($t_{cal}$) in step 207 and periodically checking whether the timer has expired in step 240, and if expired, the calibration time ($t_{cal}$) is reset and restarted at steps 250 and 207.

The frame average ($N_{median-2}$) is now compared to the sum of all detections ($N_{Frame}$) in the group for each frame in steps 220-240. If $N_{median-2}$ is greater than $N_{Frame}$, then the system may record in a string of values a "1" for this frame for this group (step 235); otherwise, it records a "0" (step 240), or vice versa. The method repeats steps 220-240 for each frame in a given group and runs method 200 for each group in the array matrix. From the string of values, a true random number may be derived. Like method 100, method 200 extracts entropy from the random variations of the flux of electrons detected by various detectors, similar to the temporal extraction for a single detector based on the times between pulses.

Methods 100 and 200 can be more generally described as (a) segmenting the array of detectors into a plurality of groups; (b) for each group: (1) detecting via multiple detectors an electron signal from the decay of the radioactive source; (2) determining a number of detections based on the detection of step (b)(1); (3) determining a group median count based on the number of detections; (4) comparing the group median count to either (A) a detection count from a single detector within the group, or (B) a detection count from multiple detectors within the group; (5) based on the comparison, assigning a value to a string of values; and (c) determining a true random number based on the string of values. The segmenting of step (a) may be based on the symmetry of the array to form groups that are exposed to the same average electron flux, as described above with reference to FIGS. 4A-4D.

A TRNG (shown in FIGS. 1-3) with a radioactive source 55, an electronic sensor comprised of an array of detectors 45 exposed to the radioactive source and a processor 80 connected to the array of detectors 45 may implement the above methods. The TRNG may further include an amplifier 15 constructed to amplify a signal generated by the sensor 45 and a filter constructed to filter the signal. The processor is connected to the array of detectors through the amplifier and filter. The sensor, processors, amplifier and filter may be formed on an integrated circuit.

The actual number of bits generated by the system will be lower due to the von Neumann randomization procedure (J. von Neumann 1951 Res. Nat. Bur. Stand. Appl. Math. Series 3, 36-38, *Various techniques used in connection with random digits*) that is necessary to remove possible bias resulting from the dead time of the system counting events and other non-random processes involved. The modern version of this normalization uses three bits instead of two, cf. e.g., Škorić (B. Škorić 2015 Lecture notes 2IMS10, Technical University Eindhoven, Holland, Physical aspects of digital security), thus increasing the efficiency of the process.

Of course, instead of counting electrons, which can be complicated (typically SPAD matrix is covered with about 8 µm of a protective material that will stop about ½ of all electrons with lower energies), one can add a scintillator that generates a flush of photons (about 1,000 per each electron) and these can be detected more easily because the matrix used would probably be designed specifically for counting photons.

Any of the suitable technologies, materials, and designs set forth and incorporated herein may be used to implement various example aspects of the invention, as would be apparent to one of skill in the art.

Although exemplary embodiments and applications of the invention have been described herein, including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible, as would be apparent to a person of ordinary skill in the art. The invention may include any device, structure, method, or functionality, as long as the resulting device, system, or method falls within the scope of one of the claims that is allowed by the patent office based on this or any related patent application.

The invention claimed is:

1. A method for correcting spatially variable electron flux in a true random number generator (TRNG), wherein the TRNG comprises a radioactive source and an array of detectors, the method comprises:
   a. segmenting the array of detectors into a plurality of groups, wherein each group in the plurality comprises at least four detectors;
   b. for each group in the plurality:
      1. detecting via multiple detectors within the group an electron signal from decay of the radioactive source;
      2. determining a number of detections based on the detection of step (b)(1);
      3. determining a group median count based on the number of detections;
      4. comparing the group median count to either (A) a detection count from a single detector within the group, or (B) a detection count from multiple detectors within the group;
      5. based on the comparison, assigning a value to a string of values;
   c. determining a true random number based on the string of values.

2. The method of claim 1, wherein the array of detectors comprises a frame rate, and step (b)(1) is carried out for an exposure period that is longer than a single frame period.

3. The method of claim 2, wherein step (b)(4) is carried out for a read period that is shorter than the exposure period.

4. The method of claim 3, wherein the exposure period is at least 10 times longer than the read period.

5. The method of claim 1, the method further comprising: for each group in the plurality:
   (b)(6) performing steps (b)(4) and (b)(5) for a recalibration period, then returning to step (b)(1) upon expiration of the recalibration period and resetting the recalibration period.

6. The method of claim 1, wherein the array of detectors comprises an array of 512×512 detectors.

7. The method of claim 1, wherein the array of detectors comprises a N×N array, where N is an even number.

8. The method of claim 1, wherein the array of detectors is segmented into more than 10 groups.

9. The method of claim 1, wherein the array of detectors is segmented into more than 100 groups.

10. The method of claim 1, wherein the segmenting of step (a) is based on the symmetry of the array of detectors to form groups that are exposed to the same average electron flux.

11. A true random number generator (TRNG) comprising:
   a radioactive source;
   an electronic sensor comprised of an array of detectors exposed to the radioactive source;
   a processor connected to the array of detectors, and constructed to generate a true random number by performing the following steps:
      a. segmenting the array of detectors into a plurality of groups, wherein each group in the plurality comprises at least four detectors;
      b. for each group in the plurality:
         1. Detecting via multiple detectors within the group an electron signal from the decay of the radioactive source;
         2. Determining a number of detections based on the detection of step (b)(1);
         3. Determining a group median count based on the number of detections;
         4. Comparing the group median count to either (A) a detection count from a single detector within the group, or (B) a detection count from multiple detectors within the group;
         5. Based on the comparison, assigning a value to a string of values;
      c. determining a true random number based on the string of values.

12. The TRNG of claim 11, wherein the array of detectors comprises an array of 512×512 detectors.

13. The TRNG of claim 11, wherein the array of detectors is segmented into more than 10 groups.

14. The TRNG of claim 11, wherein the array of detectors is segmented into more than 100 groups.

15. The TRNG of claim 11, wherein the array of detectors comprises a N×N array, where N is an even number.

16. The TRNG of claim 11, wherein the array of detectors is comprised of N column×M row of detectors, and wherein each column has a pair of detectors that belong to the same group.

17. The TRNG of claim 16, wherein each row has a pair of detectors that belong to the same group.

18. The TRNG of claim 11, further comprising an amplifier constructed to amplify a signal generated by the sensor and a filter constructed to filter the signal, wherein the processor is connected to the array of detectors through the amplifier and the filter.

19. The TRNG of claim 11, wherein the array of detectors comprises a frame rate, and step (b)(1) is carried out for an exposure period that is longer than a single frame period.

20. The TRNG of claim 19, wherein step (b)(4) is carried out for a read period that is shorter than the exposure period.

21. The TRNG of claim 20, wherein the exposure period is at least 10 times longer than the read period.

22. The TRNG of claim 11, the processor further performing steps (b)(4) and (b)(5) for a recalibration period, then returning to step (b)(1) upon expiration of the recalibration period and resetting the recalibration period.

23. The TRNG of claim 11, wherein the segmenting of step (a) is based on the symmetry of the array of detectors to form groups that are exposed to the same average electron flux generated by the radioactive source.

24. The TRNG of claim 11, wherein the electronic sensor and the processor are formed on an integrated circuit.

25. A personal electronic device comprising:
   the TRNG of claim 11; and
   a cryptographical client adapted to access the true random number.

26. The personal electronic device of claim 25, wherein the true random number is used to encrypt a communication channel, to render computer simulations, or to render computer gaming.

* * * * *